(No Specimens.)
C. A. MAXFIELD.
ANTI SLIPPING MATERIAL FROM RUBBER COMPOUNDS.
No. 248,869.          Patented Nov. 1, 1881.
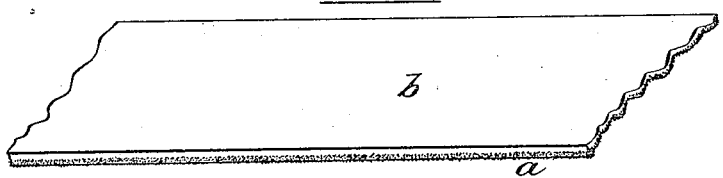
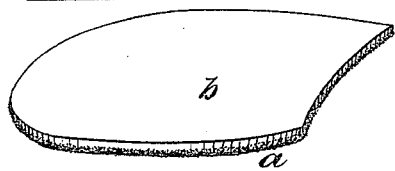
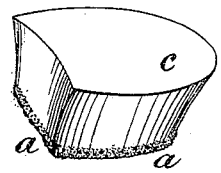
Witnesses.
H. D. Williams
Herman T. C. Kraus
Charles A. Maxfield.
Inventor.
per Alfred Shedlock Atty.

UNITED STATES PATENT OFFICE.

CHARLES A. MAXFIELD, OF NEW YORK, N. Y.

ANTI-SLIPPING MATERIAL FROM RUBBER COMPOUNDS.

SPECIFICATION forming part of Letters Patent No. 248,869, dated November 1, 1881.

Application filed January 28, 1881. (No specimens.)

*To all whom it may concern:*

Be it known that I, CHARLES A. MAXFIELD, of the city of New York, in the county and State of New York, have invented a certain new and useful Improvement in Anti-Slipping Materials from Rubber Compounds, of which the following is a specification.

This invention consists of the application of emery or granulous infrangible substance combined with a plastic material in such a manner as to enable it to be practically and cheaply applied as a means for increasing the adhesiveness of the soles and heels of boots and shoes with the ground, and insuring a more perfect foothold in wet or cold weather.

For the plastic material as a medium to hold the grain emery I propose to use india-rubber mixed with the proper ingredients to enable it to be vulcanized, and thoroughly incorporate with a sufficient quantity of it grain emery, so as to cover the bottom of the mold of the desired form, and then place over the combined india-rubber and emery a layer of plain india-rubber and subject the whole to the process of vulcanization, thus producing a material of the desired shape, one side of which is rough and virtually indestructible, by reason of the emery incorporated therewith, and the other side smooth and of such a nature as to enable it to be secured to the bottoms of boots and shoes by means of a suitable cement. The whole by this process is made sufficiently flexible and strong, as the plain rubber backing would hold the compound emery and rubber in place should it break, it being somewhat frangible on account of the grain emery destroying the continuity of the rubber.

For heels of boots and shoes the compound material may be molded into disks with central holes, by which they may be attached in place by means of screws, so as to act as revolving heels.

Adhesiveness by this invention may be imparted to boots and shoes made entirely of india-rubber by incorporating the grain emery or other suitable infrangible substance with the under sides of the soles or heels, or both, during the process of the manufacture of same, thus greatly increasing the effectiveness and durability of india-rubber boots and shoes without adding materially to the cost of the same.

The plastic material combined with grain emery, as aforesaid, may be molded in other forms than for soles and heels of boots and shoes, to be applied to places that are particularly dangerous in wet or cold weather—as, for instance, to the steps of cars and carriages.

Instead of molding my adhesive or anti-slipping material, composed of vulcanized india-rubber and grain emery combined with a plain rubber back, directly into the forms in which it is to be applied, it may be made in sheets, to be afterward cut into shape. Such method of manufacture would be advantageous for some purposes; but when the shape of the pieces is irregular considerable waste of material would occur in cutting from the sheet, so for such I prefer to use the molding process.

Figure 1 represents a sheet of my adhesive or anti-slipping material, the side *a* being the side in which the grain emery or infrangible substance is incorporated, and the side *b* the plain india-rubber backing; and Fig. 2 is a transverse section of the same.

To further strengthen the backing, I propose to insert in it a suitable textile fabric, as canvas, &c., in the process of manufacture, either when made into sheets or molded into forms.

Fig. 3 represents the sole of a boot or shoe as cut from a sheet, (represented in Fig. 1,) or as formed in a mold in the manner before described, the same to be applied to the soles of boots and shoes and the plain side of the plastic material secured thereto by means of a suitable cement; and Fig. 4 represents a modification of my invention, showing the heel of a boot or shoe made entirely of a composition, *c*, with the grain emery *a* incorporated only in the lower or wearing surface thereof, the same adapted to be attached to the boots or shoes in their manufacture, to take the place of the ordinary leather heel, the composition I find well adapted for this purpose being a mixture of ground leather and a plastic material capable of being molded and hardened or set by means of heat, or by being vulcanized. The bottom of the mold is first covered with a mixture of the composition and grain emery and then filled up with the composition alone, subjected to pressure, and then dried or vulcanized.

Having now described the nature of my in- vention and ways in which the same may be manufactured and applied, I wish it understood that I do not claim, broadly, a composition of vulcanized india-rubber and grain emery as an anti-slipping material, as such was patented to E. Osgood, on May 18, 1869, by United States Letters Patent No. 90,118.

What I claim, and desire to secure by Letters Patent, is—

As an improvement in the manufacture of anti-slipping fabrics, first covering the mold or former with a composition composed of grain emery and india-rubber adapted to be vulcanized, and then laying over the same a layer of india-rubber without emery, and vulcanizing the whole together, substantially as set forth.

In testimony whereof I have hereunto set my hand this 27th day of January, A. D. 1881.

CHAS. A. MAXFIELD.

Witnesses:
ALFRED SHEDLOCK,
PHILIP JORDAN.